(12) United States Patent
Tsuchihashi et al.

(10) Patent No.: US 10,971,985 B2
(45) Date of Patent: Apr. 6, 2021

(54) ACTUATOR AND METHOD OF PRODUCING ACTUATOR

(71) Applicant: NIDEC SANKYO CORPORATION, Nagano (JP)

(72) Inventors: Masao Tsuchihashi, Nagano (JP); Tadashi Takeda, Nagano (JP); Hiroshi Kitahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 59 days.

(21) Appl. No.: 16/259,042

(22) Filed: Jan. 28, 2019

(65) Prior Publication Data

US 2019/0238039 A1    Aug. 1, 2019

(30) Foreign Application Priority Data

Jan. 31, 2018   (JP) .............................. JP2018-015242

(51) Int. Cl.
  *H02K 33/12*   (2006.01)
  *B06B 1/04*    (2006.01)
  *F16F 9/30*    (2006.01)

(52) U.S. Cl.
  CPC ............... *H02K 33/12* (2013.01); *B06B 1/04* (2013.01); *F16F 9/30* (2013.01); *H02K 2201/18* (2013.01)

(58) Field of Classification Search
  CPC .......... B06B 1/04; B06B 1/045; H02K 33/12; H02K 33/16; H02K 2201/18; H02K 1/12; H02K 16/00; H02K 33/00
  USPC ...................................................... 310/15, 36
  See application file for complete search history.

(56) References Cited

FOREIGN PATENT DOCUMENTS

EP          3410586    * 12/2018  ............ B06B 1/045
JP      2016127789 A     7/2016

* cited by examiner

*Primary Examiner* — Burton S Mullins
(74) *Attorney, Agent, or Firm* — Cantor Colburn LLP

(57) ABSTRACT

An actuator may include a supporting body; a movable body; a first magnetic drive circuit; a second magnetic drive circuit. The first magnetic drive circuit may include a first coil and a first magnet. The second magnetic drive circuit may include a second coil and a second magnet. The actuator may further include a first yoke on a side of the first coil remote from the second coil; a second yoke on a side of the second coil remote from the first coil; and a third yoke between the first coil and the second coil. The first magnet may be held on a face of the first yoke or a face of the third yoke. The second magnet may be held on a face of the second yoke or a face of the third yoke. The third yoke may be thicker than the first and second yoke.

13 Claims, 11 Drawing Sheets

ACTUATOR AND METHOD OF PRODUCING ACTUATOR

CROSS REFERENCE TO RELATED APPLICATION

The present application claims priority under 35 U.S.C. § 119 to Japanese Application No. 2018-015242 filed Jan. 31, 2018, the entire content of which is incorporated herein by reference.

BACKGROUND

Technical Field

At least an embodiment of the present invention relates to an actuator that generates various types of vibration and a method of producing the actuator.

There has been proposed an actuator, which is a device that generates vibration by magnetic drive circuits, includes a supporting body including magnets, a movable body including coils opposing the respective magnets, and elastic members disposed between the movable body and the supporting body (refer to Japanese Unexamined Patent Application Publication No. 2016-127789). In the actuator according to Japanese Unexamined Patent Application Publication No. 2016-127789, a holder having a plate thickness in a first direction holds two first coils disposed apart from each other in a second direction orthogonal to the first direction and two second coils disposed apart from each other in a third direction orthogonal to the first and second directions. The supporting body is provided with first magnets disposed adjacent to the first coil on the two sides in the first direction and second magnets disposed adjacent to the second coil on the two sides in the first direction. Thus, the first coils and the first magnets constitute a first magnetic drive circuit that vibrates the movable body in the second direction, and the second coils and the second magnets constitute a second magnetic drive circuit that vibrates the movable body in the third direction. Consequently, the actuator generates vibrations in the second and the third directions.

The movable body of the actuator according to Japanese Unexamined Patent Application Publication No. 2016-127789 includes the first coils and the second coils on the same plane in the holder having a thickness in the first direction. This causes the movable body to have a large plane area. As a result, the actuator unfortunately has an increased plane area. In contrast, a configuration in which the first magnetic drive circuit and the second magnetic drive circuit are aligned in the thickness direction can reduce the plane area of the actuator. This, however, causes an unfortunate increase in the thickness of the actuator.

SUMMARY

At least an embodiment of the present invention, which has been conceived in light of the above-described problems, provides an actuator and a method of producing the actuator that can suppress an increase in the thickness of the actuator and reduce the plane area of the actuator.

To solve the above-described problems, an actuator according to at least an embodiment of the present invention includes a supporting body; a movable body shiftable relative to the supporting body; a first magnetic drive circuit including a first coil and a first magnet adjacent to each other in the first direction and driving the movable body in a second direction orthogonal to the first direction; a second magnetic drive circuit including a second coil and a second magnet adjacent to each other in the first direction and driving the movable body in a third direction orthogonal to the first direction and intersecting the second direction, the second coil and the second magnet being aligned with the first magnetic drive circuit in the first direction; a first yoke disposed on a side of the first coil remote from the second coil; a second yoke disposed on a side of the second coil remote from the first coil; and a third yoke disposed between the first coil and the second coil, wherein, the first magnet is held on at least one of a face of the first yoke adjacent to the first coil and a face of the third yoke adjacent to the first coil, the second magnet is held on at least one of a face of the second yoke adjacent to the second coil and a face of the third yoke adjacent to the second coil, and the third yoke has a thickness larger than the first yoke and the second yoke in the first direction.

According to at least an embodiment of the present invention, the first magnetic drive circuit and the second magnetic drive circuit are aligned with in the first direction (thickness direction) to reduce the plane area of the actuator. The yokes are disposed adjacent to the two sides of the first coil in the first direction and the two sides of the second coil in the first direction, and another yoke (third yoke) is disposed between the first coil and the second coil. This can suppress an increase in the thickness of the actuator. In such a case also, the third yoke has a thickness larger than that of the other yokes (the first yoke and the second yoke), and thus magnetic saturation does not readily occur.

In the actuator according to at least an embodiment of the present invention, the first magnet may be disposed adjacent to a first effective side portion in the first direction, the first effective side portion extending in the third direction of the first coil; the second magnet may be disposed adjacent to a second effective side portion in the first direction, the second effective side portion extending in the second direction of the second coil; the first yoke and the third yoke may be coupled with two first couplers extending in the first direction across two sides of the first coil in the second direction; and the second yoke and the third yoke may be coupled with two second couplers extending in the first direction across two sides of the second coil in the third direction. According to this aspect, the first couplers are disposed on the two sides of the first coil in the extending direction (second direction) of the ineffective side portions, and the second couplers are disposed on the two sides of the second coil in the extending direction (third direction) of the ineffective side portions. Thus, the first and second couplers can be disposed in an unoccupied space. Thus, the actuator can have smaller dimensions.

In at least an embodiment of the present invention, the first couplers each may include a sheetlike portion bent from a portion of the first yoke adjacent to the first coil in the first direction toward the third yoke, and the second couplers each may include a sheetlike portion from a portion of the second yoke adjacent to the second coil in the first direction bent toward the third yoke.

In at least an embodiment of the present invention, the actuator may further include a first coil holder holding the first coil and a second coil holder holding the second coil. The first coil holder may include a first frame holding the first coil; a first reinforcement frame disposed on a side of the first frame remote from the second coil holder; and a plurality of first columns extending in the first direction and coupling the first frame and the first reinforcement frame. The second coil holder may include a second frame holding the second coil; a second reinforcement frame disposed on a side of the second frame remote from the first coil holder; and a plurality of second columns extending in the first direction and coupling the second frame and the second reinforcement frame. A portion of the first yoke adjacent to the first coil may be disposed between the first frame and the first reinforcement frame in the first direction. A portion of the second yoke adjacent to the second coil may be disposed between the second frame and the second reinforcement frame in the first direction. According to this aspect, the first yoke is disposed in the space between the first frame and the first reinforcement frame of the first coil holder, and the second yoke is disposed in the space between the second frame and the second reinforcement frame of the second coil holder. Thus, the actuator can have small dimensions.

In at least an embodiment of the present invention, the first magnet may be held on a face of the first yoke adjacent to the first coil and a face of the third yoke adjacent to the first coil, and the second magnet may be held on a face of the second yoke adjacent to the second coil and a face of the third yoke adjacent to the second coil.

In at least an embodiment of the present invention, the first coil and the second coil may be disposed on the supporting body, and the first magnet, the second magnet, the first yoke, the second yoke, and the third yoke may be disposed on the movable body. According to this aspect, the movable body requires no wiring connection, unlike a movable body provided with coils.

In at least an embodiment of the present invention, a first elastic member having elasticity or viscoelasticity may be disposed in contact with both the movable body and a first sheetlike part of the supporting body, the first elastic member being disposed between the movable body and the first sheetlike part of the supporting body adjacent to a side of the first coil on the movable body, the side of the first coil being remote from the second coil, and a second elastic member having elasticity or viscoelasticity may be disposed in contact with both the movable body and a second part of the supporting body, the second elastic member being disposed between the movable body and the second part of the supporting body adjacent to a side of the second coil on the movable body, the side of the second coil being remote from the first coil.

In at least an embodiment of the present invention, the first elastic member may be disposed between the first sheetlike part and the first yoke and in contact with both the first sheetlike part and the first yoke, and the second elastic member may be disposed between the second part and the second yoke and in contact with both the second part and the second yoke.

A method of producing the actuator having such a configuration include preparing a jig including a first positioning pin protruding from a support in the first direction and a second positioning pin protruding from the support farther than the first positioning pin in the first direction; forming first through-holes in the first sheetlike part to receive the first positioning pin and the second positioning pin; forming a second through-hole in the first yoke to receive the second positioning pin; performing a first step of disposing the first sheetlike part in contact with the support by passing the first positioning pin and the second positioning pin through the first through-holes; performing a second step of disposing the first elastic member on the first sheetlike part, disposing an end of the first positioning pin in contact with the first yoke, and passing the second positioning pin¥ through the second through-hole; and assembling the supporting body and the movable body based on the first sheetlike part and the first yoke.

The method of producing the actuator according to another aspect includes preparing a jig including a positioning pin including a thick portion protruding from a support in a first direction and a thin portion protruding from an end of the thick portion; forming a first through-hole in the first sheetlike part to receive the positioning pin; forming a second through-hole in the first yoke having an inner diameter smaller than the outer diameter of the thick portion and larger than the outer diameter of the thin portion; performing a first step of disposing the first sheetlike part in contact with the support by passing the positioning pin through the first through-hole; performing a second step of disposing the first elastic member on the first sheetlike part, disposing a stepped portion disposed between the thick portion and the thin portion of the positioning pin and in contact with the first yoke, and passing the thin portion of the positioning pin through the second through-hole; and assembling the supporting body and the movable body based on the first sheetlike part and the first yoke.

According to at least an embodiment of the present invention, the first magnetic drive circuit and the second magnetic drive circuit are aligned with in the first direction (thickness direction) to reduce the plane area of the actuator. The yokes are disposed adjacent to the two sides of the first coil in the first direction and the two sides of the second coil in the first direction, and another yoke (third yoke) is disposed between the first coil and the second coil. This can suppress an increase in the thickness of the actuator. In such a case also, the third yoke has a thickness larger than that of the other yokes (the first yoke and the second yoke), and thus magnetic saturation does not readily occur.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will now be described with reference to the accompanying drawings. In the description below, the three directions intersecting each other are referred to as a second direction X, a third direction Y, and a first direction Z. The first direction Z is orthogonal to the second direction X and the third direction Y. In the following description, X1 is allotted to a first side in the second direction X, and X2 is allotted to a second side in the second direction X; Y1 is allotted to a first side in the third direction Y, and Y2 is allotted to a second side in the third direction Y; and Z1 is allotted to a first side in the first direction Z, and Z2 is allotted to a second side in the first direction Z.

(Overall Configuration)

Figure 1:
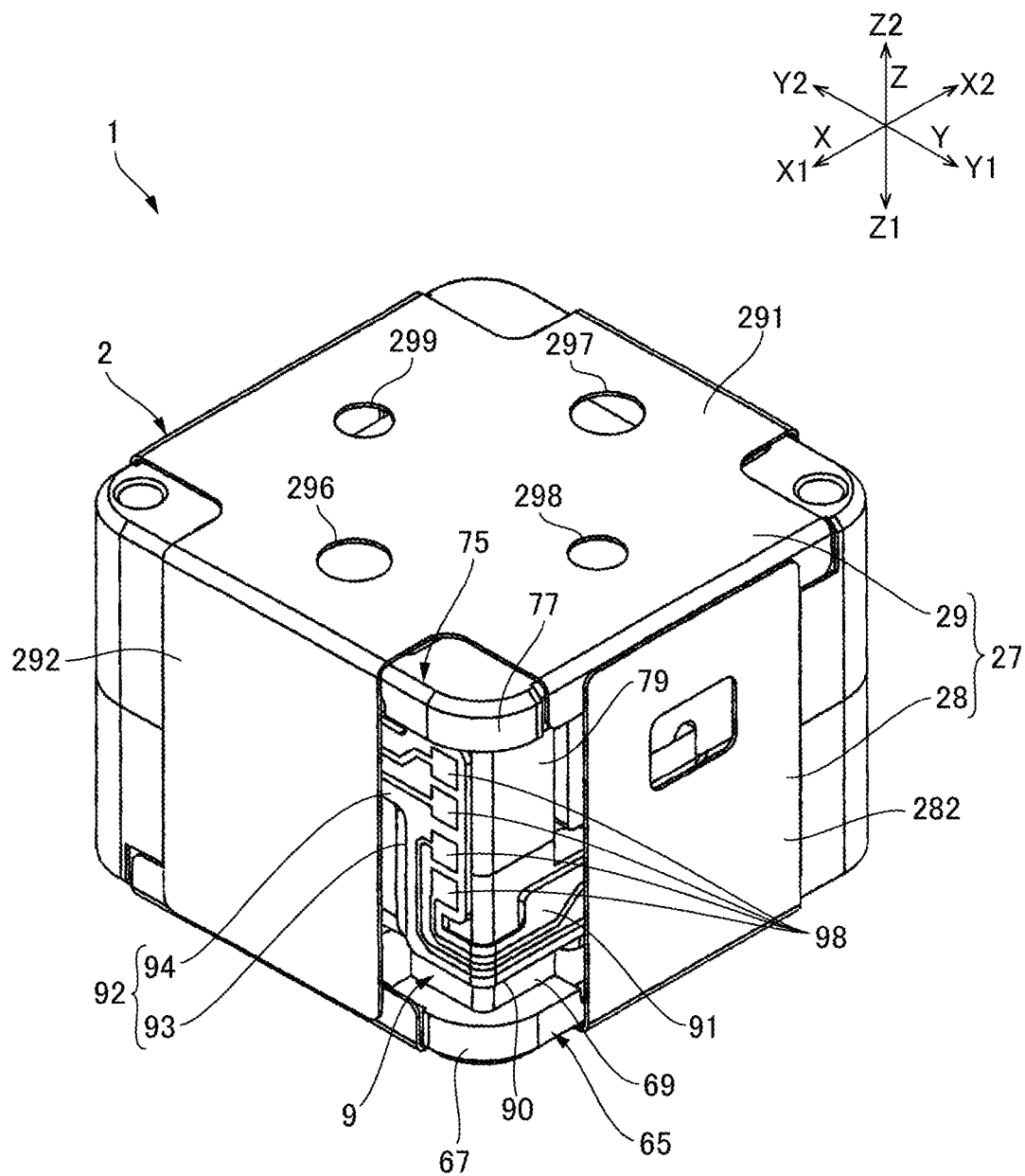
FIG. 1 is a perspective view of an actuator according to at least an embodiment of the present invention.
Figure 2:
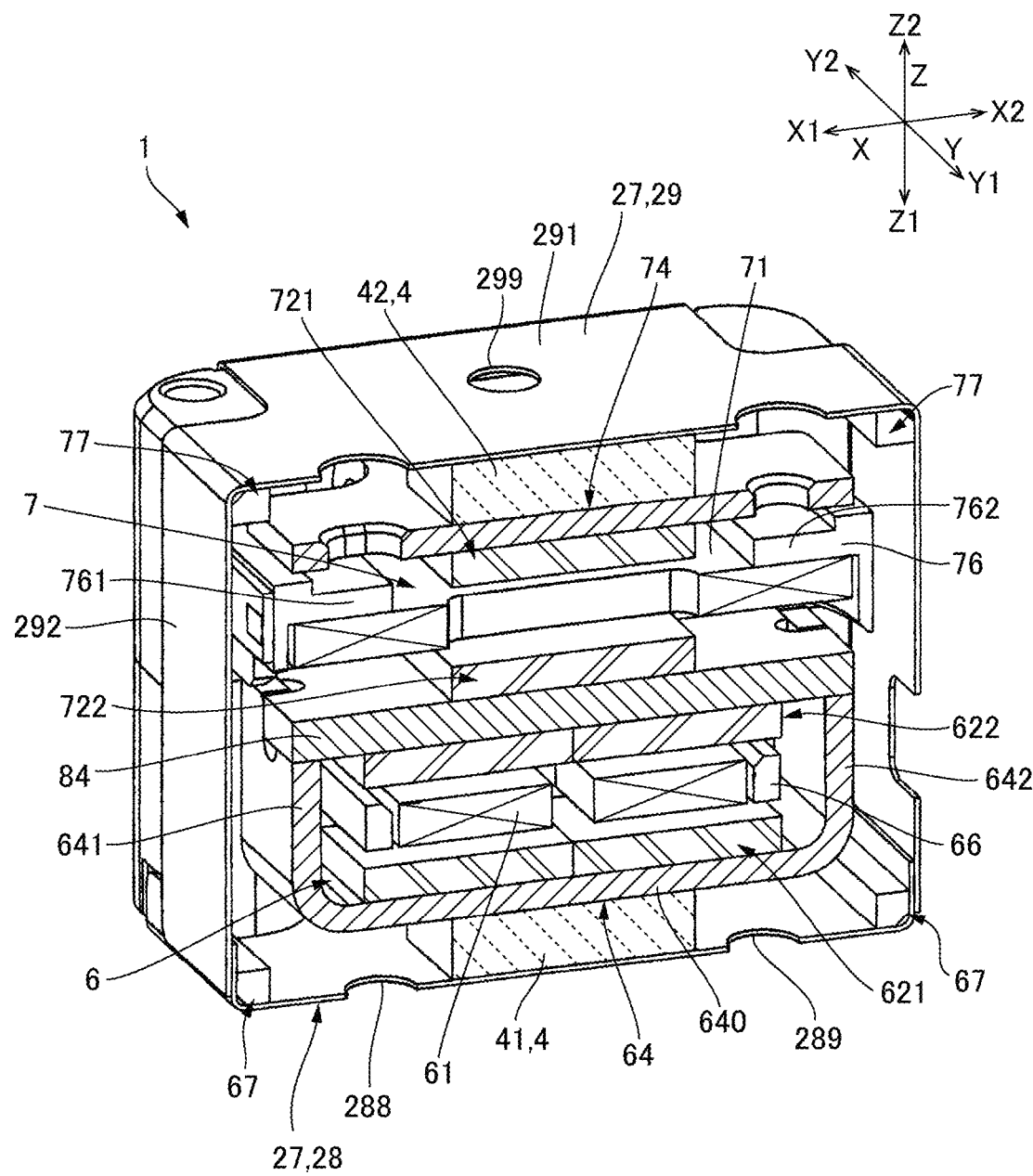
FIG. 2 is a cross-sectional view of the actuator taken along first and second directions in FIG. 1.
Figure 3:
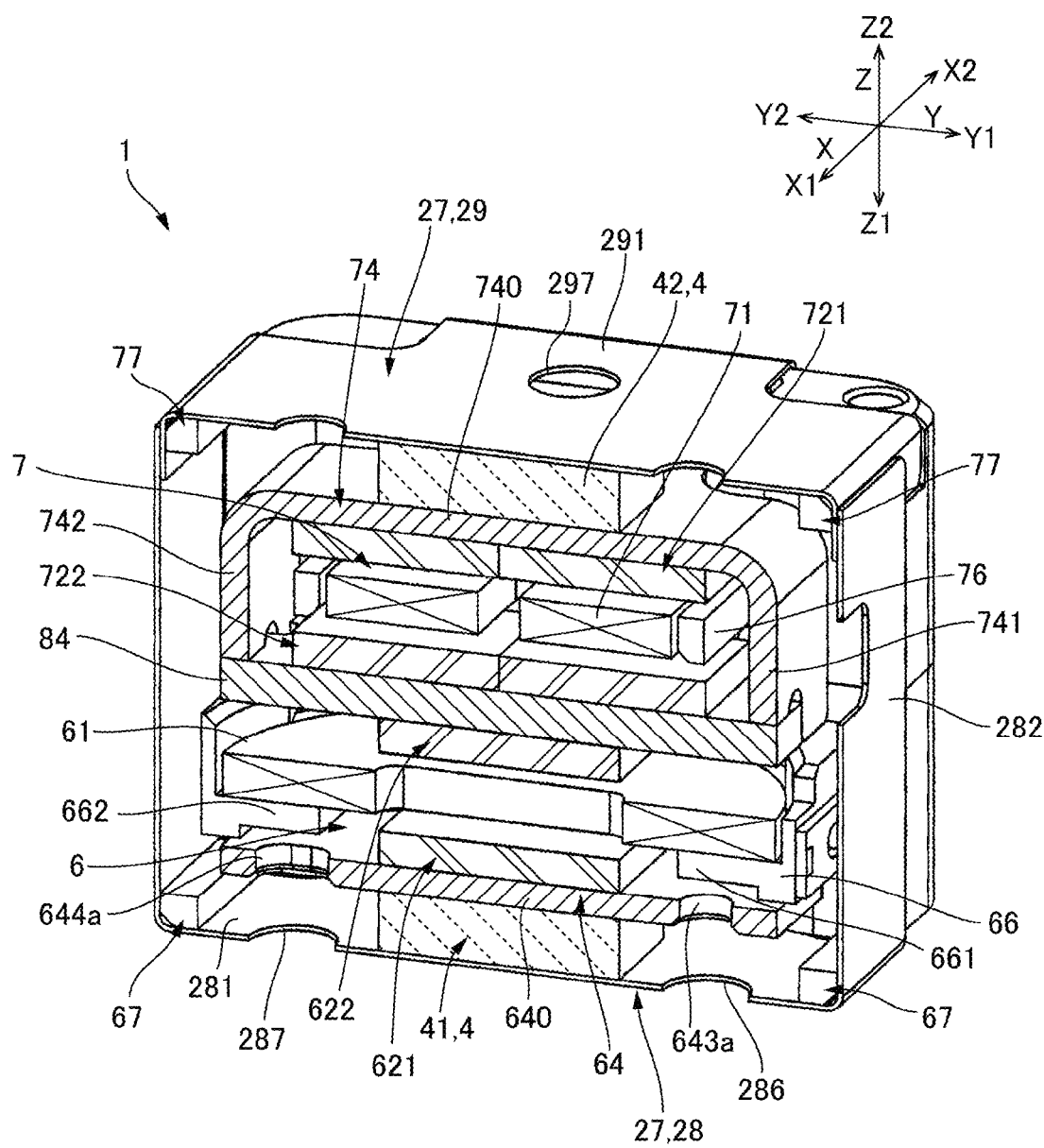
FIG. 3 is a cross-sectional view of the actuator taken along first and third directions in FIG. 1.
Figure 4:
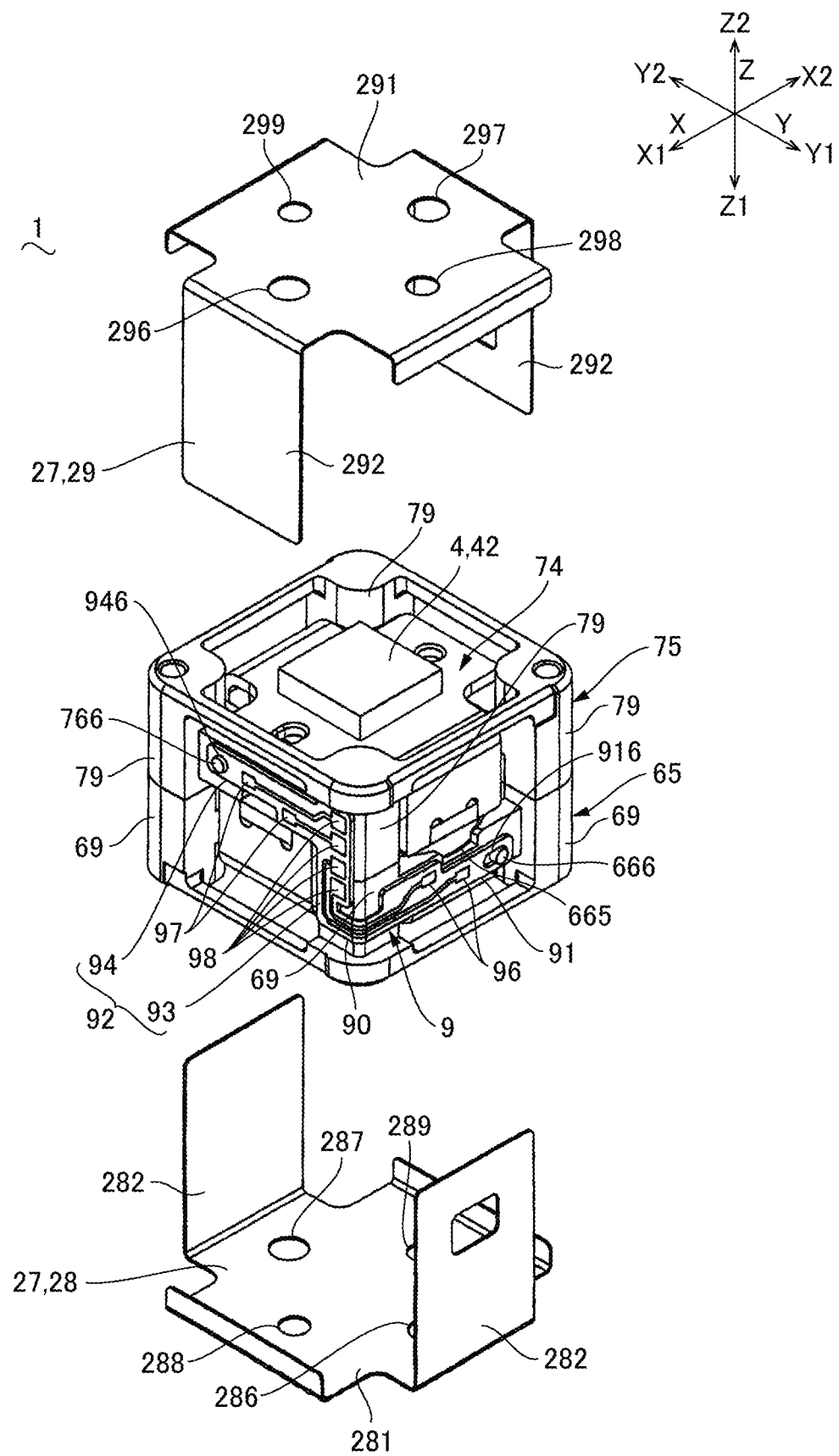
FIG. 4 is an exploded perspective view of the actuator in FIG. 1 with first and second sheetlike parts of the restraining member in FIG. 1 in a detached state.

FIG. 1 is a perspective view of an actuator 1 according to at least an embodiment of the present invention. FIG. 2 is a cross-sectional view of the actuator 1 in FIG. 1 taken along the first direction Z and the second direction X. FIG. 3 is a cross-sectional view of the actuator 1 taken along the first direction Z and the third direction Y in FIG. 1. FIG. 4 is an exploded perspective view of the actuator 1 with a first sheetlike part 28 and a second sheetlike part 29 of a restraining member 27 illustrated in FIG. 1 in a detached state.

With reference to FIG. 1, the actuator 1 according to this embodiment has a substantially cuboidal shape and receives electrical power from an external unit through a flexible wiring board 9. With reference to FIG. 1, FIG. 2, FIG. 3, and FIG. 4, the actuator 1 includes a supporting body 2, a movable body 3, and elastic members 4 (first elastic member 41 and second elastic member 42) disposed between the supporting body 2 and the movable body 3. The movable body 3 is supported by the supporting body 2 via the elastic member 4 such that the movable body 3 is shiftable in the first direction Z, the second direction X, and the third direction Y. The actuator 1 includes drive circuits that cause the movable body 3 to vibrate relative to the supporting body 2. In this embodiment, the drive circuits are a first magnetic drive circuit 6 that causes the movable body 3 to vibrate in the second direction X relative to the supporting body 2 and a second magnetic drive circuit 7 that causes the movable body 3 to vibrate in the third direction Y relative to the supporting body 2. Since the movable body 3 can vibrate in the second direction X and the third direction Y, the vibration that can be sensed by the user touching the actuator 1 is vibration in the second direction X, vibration in the third direction Y, and a combination of vibration in the second direction X and vibration in the third direction Y.

The supporting body 2 includes multiple components aligned along the first direction Z and the restraining member 27 restraining the components on the two sides in the first direction Z. A first elastic member 41 (elastic member 4) having elasticity or viscoelasticity is disposed between the restraining member 27 and the movable body on the first side Z1 in the first direction Z. The first elastic member 41 is in contact with the restraining member 27 and the movable body 3. A second elastic member 42 (elastic member 4) having elasticity or viscoelasticity is disposed between the restraining member 27 and the movable body 3 on the second side Z2 in the first direction Z. The second elastic member 42 is in contact with the restraining member 27 and the movable body 3. Both of the elastic members 4 (the first elastic member 41 and the second elastic member 42) are compressed in the first direction Z.

The elastic members 4 according to this embodiment are viscoelastic bodies, in particular are gel plates. The faces of the first elastic member 41 in the first direction Z may be connected to the movable body 3 and the restraining member 27 through adhesion. The faces of the second elastic member 42 in the first direction Z may be connected to the movable body 3 and the restraining member 27 through adhesion.

A gelatinous damper has linear or non-linear shrinkage depending on the direction of shrinking. For example, when a platelike gelatinous damper is pressed in the thickness direction (axial direction) and compressively deformed, the non-linear component of the shrinkage is larger than the linear component of the shrinkage, whereas when the damper is pulled in the thickness direction (axial direction) and stretches, the linear component of the shrinkage is larger than the non-linear component of the shrinkage. When the damper deforms in a shearing direction intersecting the thickness direction (axial direction), the linear component of the deformation is larger than the non-linear component of the deformation. In this embodiment, when the movable body 3 vibrates in the second direction X and the third direction Y, the elastic members 4 (viscoelastic bodies) deform along the shearing direction. Thus, the elastic members 4 can achieve vibration characteristics having satisfactory linearity because the elastic members 4 deform with high linearity.

The magnetic drive circuits (first magnetic drive circuit 6 and second magnetic drive circuit 7) each includes a coil and magnets disposed adjacent to the coil in the first direction Z. The coil is disposed on one of the supporting body 2 and the movable body 3, and the magnets are disposed on the other one of the supporting body 2 and the movable body 3. As described below in this embodiment, coils (first coil 61 and second coil 71) and coil holders (first coil holder 65 and second coil holder 75) are disposed on the supporting body 2. Magnets (first magnets 621 and 622 and second magnets 721 and 722) and yokes (first yoke 64, second yoke 74, and third yoke 84) are disposed on the movable body 3.

The first magnetic drive circuit 6 is aligned with the second magnetic drive circuit 7 along the first direction Z such that the first magnetic drive circuit 6 is adjacent to the first side Z1 of the second magnetic drive circuit 7. Thus, the actuator 1 has small dimensions (plane area) in view along the first direction Z. Thus, the actuator 1 according to this embodiment can be suitably installed in a device such as a hand-held controller.

(Schematic Configurations of First Magnetic Drive Circuit 6 and Second Magnetic Drive Circuit 7)

As illustrated in FIG. 2 and FIG. 3, the first magnetic drive circuit 6 and the second magnetic drive circuit 7 have the same basic configuration in which the two magnetic drive circuits are symmetric about the first direction Z and rotated by 90 degrees relative to each other around a central axis extending along the first direction Z. In detail, the first magnetic drive circuit 6 includes the first coil 61, the first magnet 621 disposed such that the first side Z1 thereof is adjacent to the first coil 61 in the first direction Z, and the first magnet 622 disposed such that the second side Z2 thereof is adjacent to the first coil 61 in the first direction Z. In contrast, the second magnetic drive circuit 7 includes the second coil 71, the second magnet 721 disposed such that the first side Z1 thereof is adjacent to the second coil 71 in the first direction Z, and the second magnet 722 disposed such that the second side Z2 thereof is adjacent to the second coil 71 in the first direction Z. The second magnetic drive circuit 7 (the second coil 71 and the second magnets 721 and 722) is disposed on the second side Z2 of the first magnetic drive circuit 6 and aligned with the first magnetic drive circuit 6 in the first direction Z.

The supporting body 2 is provided with a first coil holder 65 holding the first coil 61 and a second coil holder 75 holding the second coil 71, to align the first magnetic drive circuit 6 and the second magnetic drive circuit 7, having the configurations described above, in the first direction Z. The first coil holder 65 and the second coil holder 75 are aligned in the first direction Z in this order from the first side Z1 to the second side Z2 in the first direction Z. The first coil holder 65 is coupled with the second coil holder 75.

The movable body 3 includes multiple yokes (first yoke 64, second yoke 74, and third yoke 84) disposed on the first coil 61 on the first side Z1 in the first direction Z, between the first coil 61 and the second coil 71, and on the second coil 71 on the second side Z2 in the first direction Z. The first magnets 621 and 622 and the second magnets 721 and 722 are respectively held by the yokes. In this embodiment, the yokes include a first yoke 64 disposed adjacent to the first side Z1 of the first coil 61 in the first direction Z, a second yoke 74 disposed adjacent to the second side Z2 of the second coil 71 in the first direction Z, and a third yoke 84 disposed between the first coil 61 and the second coil 71. The face of the first yoke 64 adjacent to the first coil 61 holds the first magnet 621, and the face of the third yoke 84 adjacent to the first coil 61 holds the first magnet 622. The face of the second yoke 74 adjacent to the second coil 72 holds the second magnet 721, and the face of the third yoke 84 adjacent to the second coil 71 holds the second magnet 722.

(Detailed Configuration of First Magnetic Drive Circuit 6)

Figure 5:
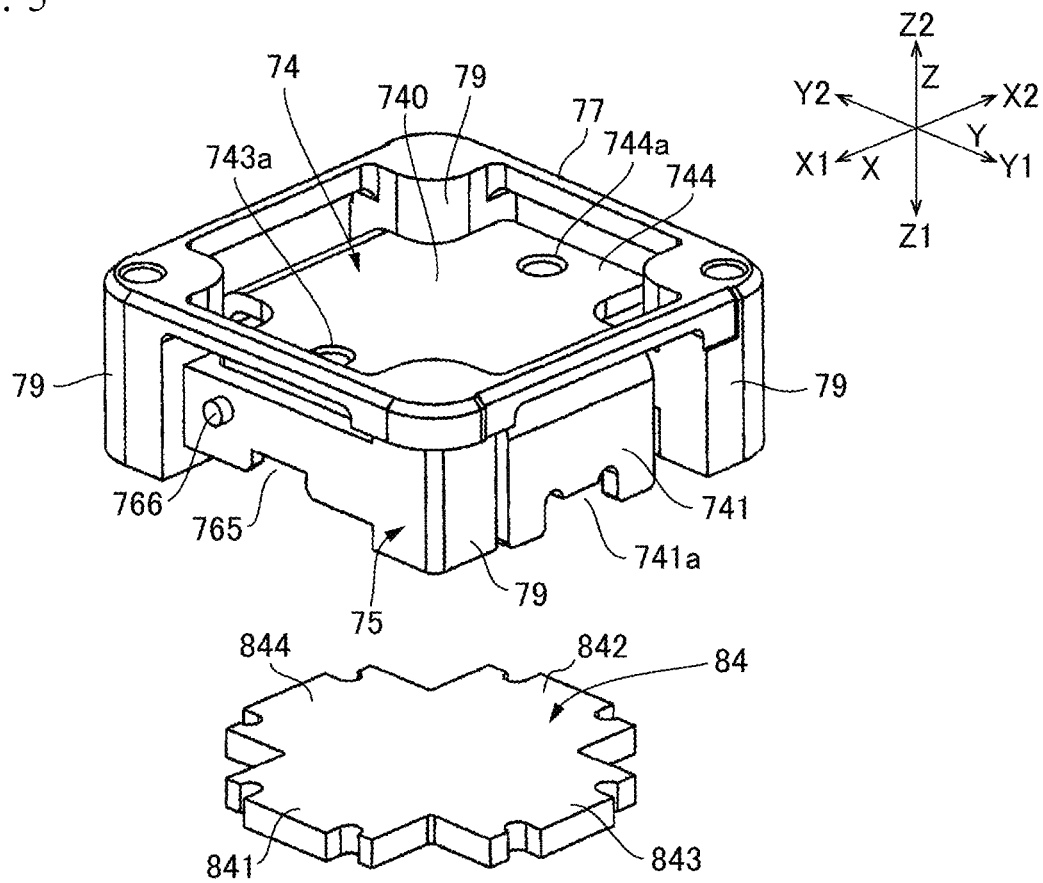
FIG. 5 is an exploded perspective view of drive circuits of the actuator in FIG. 1 viewed from a second side in the first direction.
Figure 5:
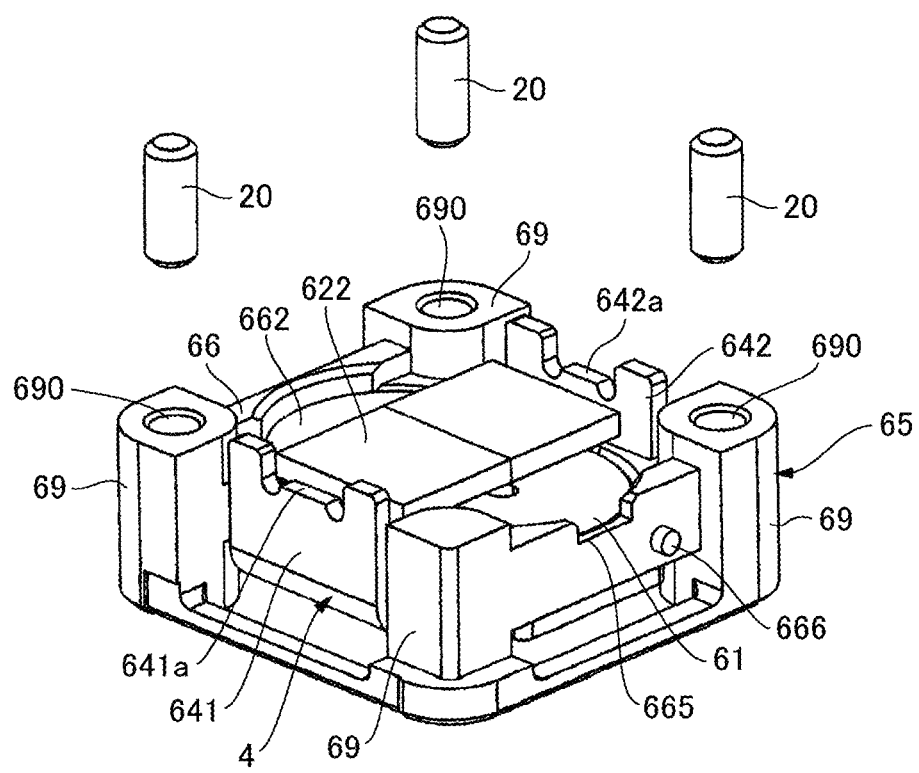
Figure 6:
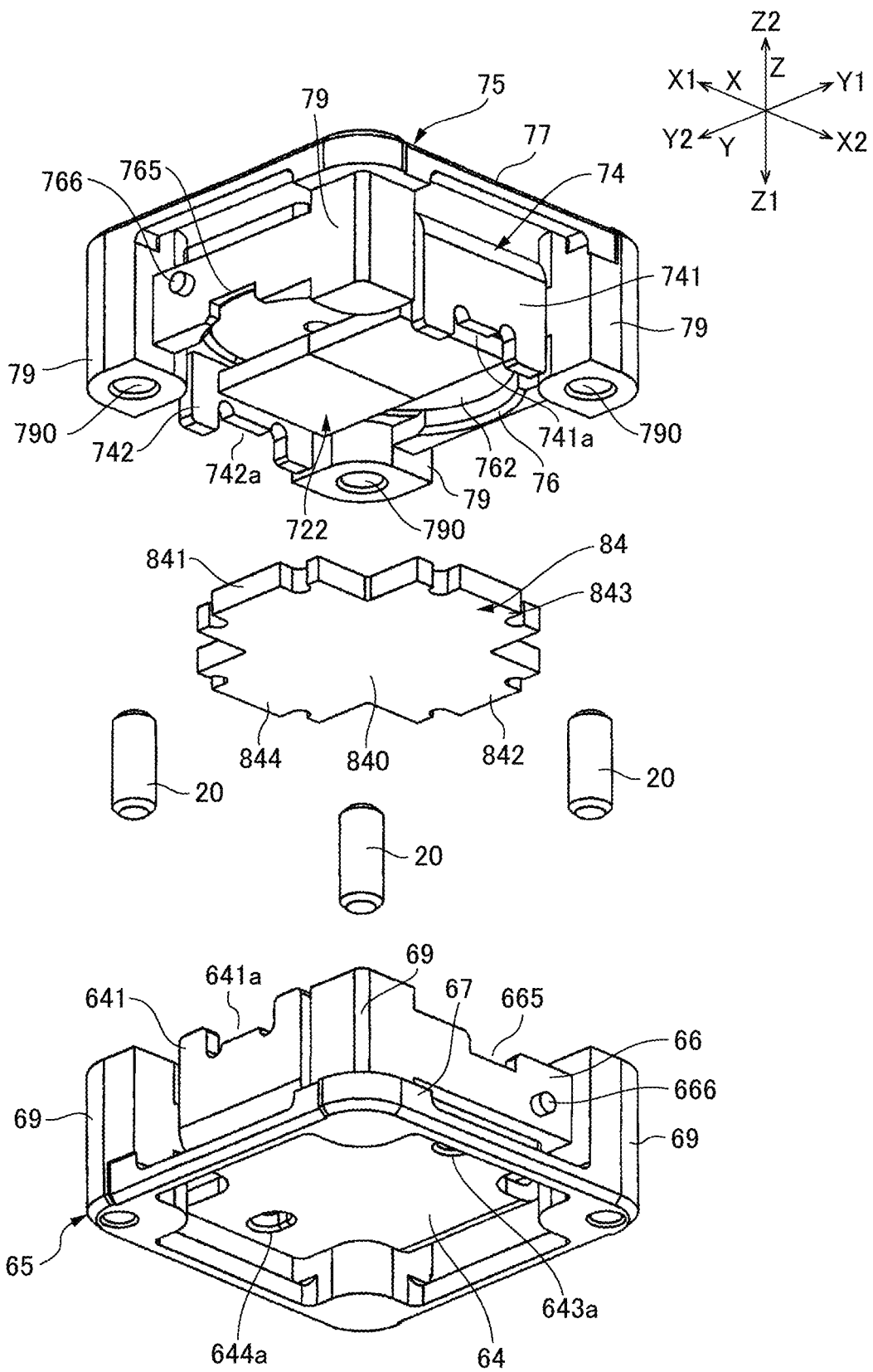
FIG. 6 is an exploded perspective view of the drive circuits of the actuator in FIG. 1 viewed from a first side in the first direction.
Figure 7:
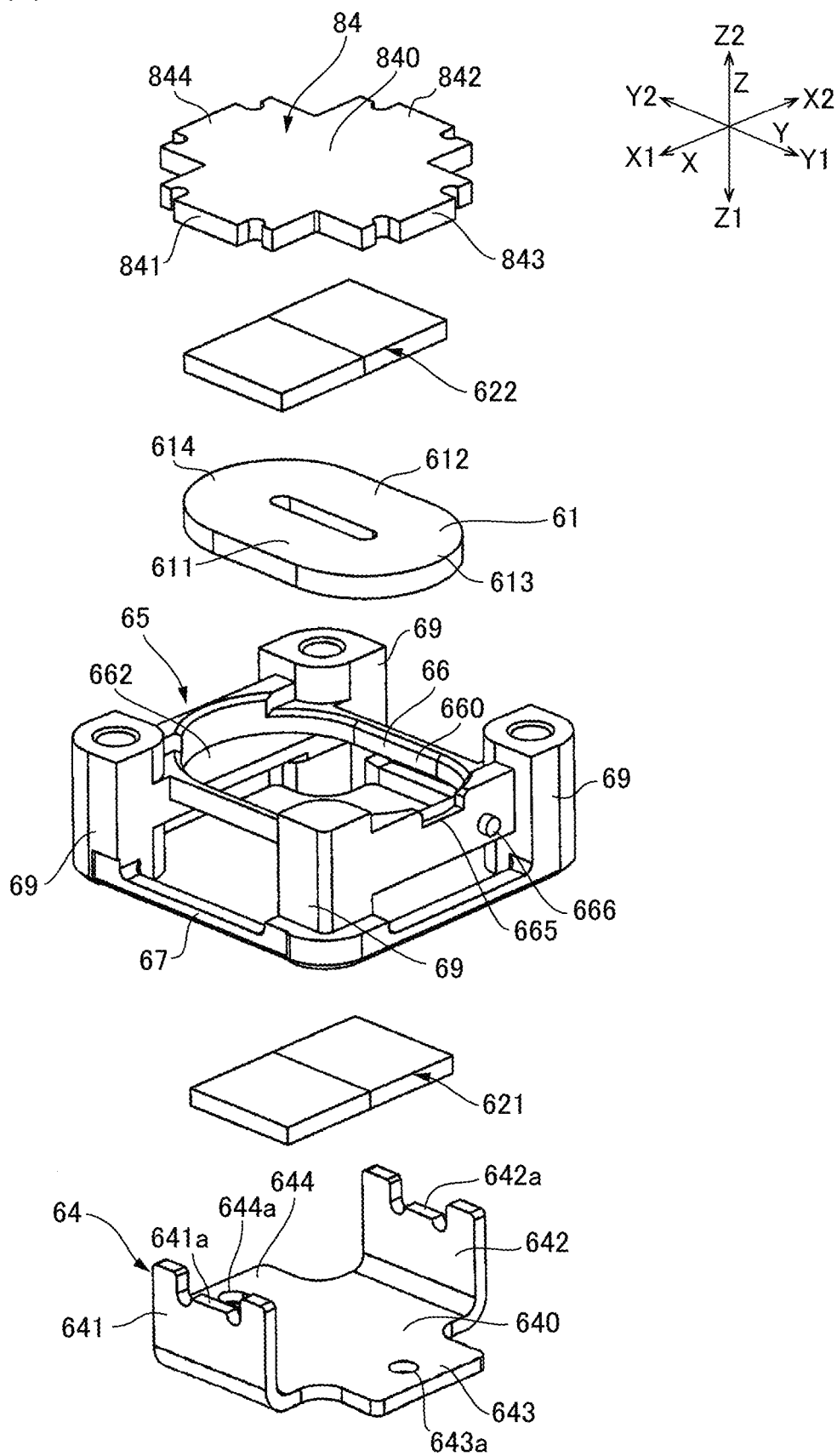
FIG. 7 is an exploded perspective view of the first magnetic drive circuit illustrated in FIG. 2 and FIG. 3.

FIG. 5 is an exploded perspective view of the drive circuits of the actuator 1 viewed from the second side Z2 in the first direction Z in FIG. 1. FIG. 6 is an exploded perspective view of the drive circuits of the actuator 1 viewed from the first side Z1 in the first direction Z in FIG. 1. FIG. 7 is an exploded perspective view of the first magnetic drive circuit 6 illustrated in FIG. 2 and FIG. 3.

With reference to FIG. 2, FIG. 3, FIG. 5, FIG. 6, and FIG. 7, the first coil holder 65 includes a first frame 66 holding the first coil 61 therein, a first reinforcement frame 67 disposed adjacent to the first side Z1 of the first frame 66 in the first direction Z, and multiple first columns 69 connecting the edges of the first frame 66 and corresponding edges of the first reinforcement frame 67. In this embodiment, the first frame 66 and the first reinforcement frame 67 each have a quadrangular external shape viewed from the first direction Z. The first columns 69 are disposed at the four corners of the quadrangle. The first columns 69 protrude from the first frame 66 toward the second coil holder 75. The first coil holder 65 is composed of resin or metal. The first coil holder 65 according to this embodiment is composed of resin.

The first coil 61 of the first magnetic drive circuit 6 is an elliptical coreless coil having first effective side portions 611 and 612 (long side portions) extending in the third direction Y. The first frame 66 of the first coil holder 65, which corresponds to this shape, has an elliptical first opening 660 having a major axis along the third direction Y. The first coil 61 is fixed inside the first opening 660 with an adhesive agent or any other means.

First seats 661 and 662 are disposed on the first frame 66 of the first coil holder 65 on the first side Z1 in the first direction Z at positions overlapping the two edges of the first opening 660 in the third direction Y. The first seats 661 and 662 support, on the first side Z1 in the first direction Z, first ineffective portions 613 and 614, respectively, (short side portions) disposed at the two edges of the first coil 61 and extending along the second direction X. The first seats 661 and 662 protrude from the first frame 66 to the first side Z1 in the first direction Z and constitute bottom portions of the first opening 660 on the first side Z1 in the first direction Z at the two edges in the third direction Y. The face of the first frame 66 on the second side Z2 in the first direction Z has a cutout 665 adjacent to the first opening 660 on the first side Y1 of in the third direction Y. The cutout 665 is a guide through which the leading end of the wire of the first coil 61 and the trailing end of the wire of the first coil 61 are passed. The thickness of the first frame 66 (in the first direction Z) is larger than the thickness of the first coil 61 (in the first direction Z). Thus, the first coil 61 does not protrude from the first frame 66 on the second side Z2 in the first direction Z while the first coil 61 is disposed inside the first opening 660. The external face of the first frame 66 of the first coil holder 65 is provided with a protrusion 666 protruding from the first side Y1 in the third direction Y.

The first magnets 621 and 622 each have a rectangular plan view. The long sides of the first magnets 621 and 622 extend along the second direction X, and the short sides extend along the third direction Y. The first magnets 621 and 622 are magnetically polarized in the second direction X. The N and S poles of the magnets oppose the first effective side portions 611 and 612, respectively, of the first coil 61. Thus, when the first coil 61 is energized, the first magnetic drive circuit 6 generates a driving force that drives the movable body 3 in the second direction X.

The third yoke 84 of the first magnetic drive circuit 6 has a planar shape and a flat portion 840 having a face on the first side Z1 in the first direction Z holding the first magnet 622. The first yoke 64 has a flat magnet holding portion 640 having a face on the second side Z2 in the first direction Z holding the magnet 621, and two first couplers 641 and 642 bent from the two edges of the magnet holding portion 640 in the second direction X toward the second side Z2 in the first direction Z. The first couplers 641 and 642 are each coupled with the third yoke 84. The edges of the first couplers 641 and 642 on the second side Z2 in the first direction Z have cutouts 641a and 642a, respectively. The edge of the flat portion 840 of the third yoke 84 on the first side X1 and the second side X2 in the second direction X have projections 841 and 842, respectively, that fit to the cutouts 641a and 642a, respectively. In this embodiment, the first couplers 641 and 642 of the first yoke 64 and the third yoke 84 are coupled by welding or swaging.

The first yoke 64 has flat portions 643 and 644 protruding from the two edges of the magnet holding portion 640 in the third direction Y toward the first side Y1 and the second side Y2, respectively, in the third direction Y. The flat portions 643 and 644 have through-holes 643a and 644a, respectively.

In the first magnetic drive circuit 6 having such a configuration, the magnet holding portion 640 of the first yoke 64 adjacent to the second coil 71 and the first magnet 621 are disposed between the first frame 66 and the first reinforcement frame 67 of the first coil holder 65 along the first direction Z. The first couplers 641 and 642 protrude from between the first frame 66 and the first reinforcement frame 67 toward the third yoke 84. In this embodiment, the first yoke 64 is disposed in the space between the first frame 66 and the first reinforcement frame 67 of the first coil holder 65. Thus, the actuator 1 can have reduced dimensions.

(Configuration of Second Magnetic Drive Circuit 7)

Figure 8:
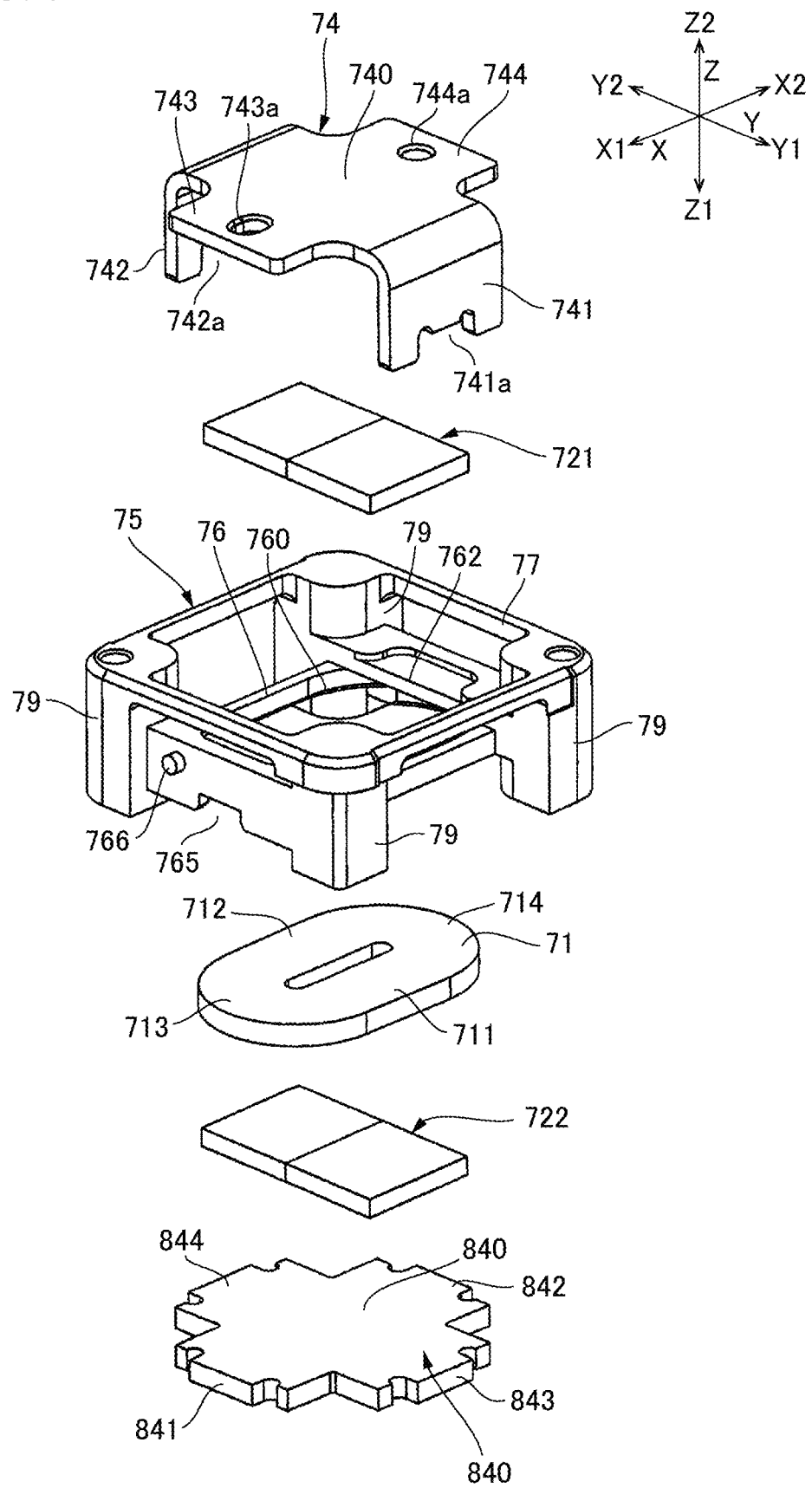
FIG. 8 is an exploded perspective view of the second magnetic drive circuit illustrated in FIG. 2 and FIG. 3.

FIG. 8 is an exploded perspective view of the second magnetic drive circuit 7 illustrated in FIG. 2 and FIG. 3. With reference to FIG. 2, FIG. 3, FIG. 5, FIG. 6, and FIG. 8, the second coil holder 75 includes a second frame 76 holding the second coil 71 therein, a second reinforcement frame 77 disposed adjacent to the second frame 76 on the second side Z2 in the first direction Z, and multiple second columns 79 connecting the edges of the second frame 76 and edges of the second reinforcement frame 77. In this embodiment, the second frame 76 and the second reinforcement frame 77 viewed along the first direction Z each have a quadrangular external shape. The second columns 79 are disposed at the four corners of the quadrangle. The second columns 79 protrude from the second frame 76 toward the first coil holder 65. The end faces of the second columns 79 are in contact with the end faces of the corresponding first columns 69 of the first coil holder 65. Thus, the first coil holder 65 and the second coil holder 75 (the first coil 61 and the second coil 71) can be disposed apart from each other by an appropriate distance. The second coil holder 75 is composed of resin or metal. The second coil holder 75 according to this embodiment is composed of resin.

The second coil 71 of the second magnetic drive circuit 7 is an elliptical coreless coil having second effective side portions 711 and 712 (long side portions) extending along the second direction X. The second frame 76 of the second coil holder 75, which corresponds to this shape, has an elliptical second opening 760 having a major axis along the second direction X. The second coil 71 is fixed inside the second opening 760 with an adhesive agent or any other means.

Second seats 761 and 762 are disposed on the second frame 76 of the second coil holder 75 on the second side Z2 in the first direction Z at positions overlapping the two edges of the second opening 760 in the second direction X. The second seats 761 and 762 support, on the second side Z2 in the first direction Z, second ineffective portions 713 and 714, respectively, (short side portions) disposed at the two edges of the second coil 71 and extending along the third direction Y. The second seats 761 and 762 protrude from the second frame 76 to the second side Z2 in the first direction Z and constitute bottom portions of the second opening 760 on the second side Z2 in the first direction Z at the two edges in the second direction X. The face of the second frame 76 on the first side Z1 in the first direction Z has a cutout 765 adjacent to of the second opening 760 on the first side X1 in the second direction X. The cutout 765 is a guide through which the leading and the trailing ends of the wire of the second coil 71 are passed. The thickness of the second frame 76 (in the first direction Z) is larger than the thickness of the second coil 71 (in the first direction Z). Thus, the second coil 71 does not protrude from the second frame 76 on the first side Z1 in the first direction Z while the second coil 71 is a disposed inside the second opening 760. The external face of the second frame 76 of the second coil holder 75 is provided with a protrusion 766 protruding from the first side X1 in the second direction X.

The second magnets 721 and 722 each have a rectangular plan view. The long sides of the second magnets 721 and 722 extend along the third direction Y, and the short sides extend along the second direction X. The second magnets 721 and 722 are magnetically polarized in a direction along the third direction Y. The N and S poles of the magnets oppose the second effective side portions 711 and 712, respectively, of the second coil 71. Thus, when the second coil 71 is energized, the second magnetic drive circuit 7 generates a driving force that drives the movable body 3 in the third direction Y.

The third yoke 84 is shared between the second magnetic drive circuit 7 and the first magnetic drive circuit 6 and has the flat portion 840 having a face on the second side Z2 in the first direction Z holding the second magnet 722. Hence, the yokes are disposed adjacent to the two sides of the first coil 61 in the first direction Z and the two sides of the second coil 71 in the first direction Z, and one of the yokes (third yoke 84) is disposed between the first coil 61 and the second coil 71. This can suppress an increase in the thickness (length in the first direction Z) of the actuator 1.

The third yoke 84 has a thickness in the first direction Z larger than that of the other yokes (the first yoke 64 and the second yoke 74). Thus, even when the third yoke 84 is shared between the first magnetic drive circuit 6 and the second magnetic drive circuit 7, magnetic saturation does not readily occur.

The second yoke 74 has a flat magnet holding portion 740 that holds the second magnet 721 on the face on the first side Z1 in the first direction Z and two second couplers 741 and 742 that are platelike portions bent from the two edges of the holding portion 740 in the third direction Y toward the first side Z1 in the first direction Z. The second couplers 741 and 742 are each coupled with the third yoke 84. The edges of the second couplers 741 and 742 on the first side Z1 in the first direction Z have cutouts 741a and 742a, respectively. The edge of the flat portion 840 of the third yoke 84 on the first side Y1 and the second side Y2 in the third direction Y have projections 841 and 842, respectively, that fit to the cutouts 741a and 742a, respectively. In this embodiment, the second couplers 741 and 742 of the second yoke 74 and the third yoke 84 are coupled by welding or swaging.

The second yoke 74 has flat portions 743 and 744 protruding from the two edges of the magnet holding portion 740 in the second direction X toward the first side X1 and second side X2 in the second direction X. The flat portions 743 and 744 have through-holes 743a and 744a, respectively.

In the second magnetic drive circuit 7 having such a configuration, the magnet holding portion 740 of the second yoke 74 facing the second coil 72 and the second magnet 721 are disposed between the second frame 76 and the second reinforcement frame 77 of the second coil holder 75 along the first direction Z. The second couplers 741 and 742 protrude from between the second frame 76 and the second reinforcement frame 77 toward the third yoke 84. In this embodiment, the second yoke 74 is disposed in the space between the second frame 76 and the second reinforcement frame 77 of the second coil holder 75. Thus, the actuator 1 can have reduced dimensions.

The first yoke 64 and the second yoke 74 coupled with the third yoke 84 serve as an assembly of multiple yokes (the first yoke 64, the second yoke 74, and the third yoke 84) for the movable body 3. The first yoke 64 and the third yoke 84 are coupled through the first couplers across the two edges of the first coil 61 in the second direction X. The first couplers 641 and 642 are disposed along the extending direction (second direction) of the ineffective side portions of the first coil 61. The second yoke 74 and the third yoke 84 are coupled through the second couplers across the two edges of second coil 71 in the third direction Y. The second couplers 741 and 742 are disposed along the extending direction (third direction) of the ineffective side portions of the second coil 71. Thus, the first couplers and the second couplers can be disposed in gaps, thereby reducing the dimensions of the actuator.

(Coupled Structure of First Coil Holder 65 and Second Coil Holder 75)

With reference to FIG. 5 and FIG. 6, the first coil holder 65 and the second coil holder 75 have multiple bottomed holes 690 and 790, respectively, on faces adjacent to each other in the first direction Z. The first coil holder 65 and the second coil holder 75 are positioned with pins fitting in the holes 690 and 790. In this embodiment, the end faces of the first columns 69 of the first coil holder 65 are in contact with the end faces of the respective second columns 79 of the second coil holder 75. Thus, among the first columns 69 and the second columns 79, at least two pairs of the first columns 69 and the second columns 79 in contact with each other have the holes 690 and 790, respectively. In this embodiment, three pairs of the first columns 69 and the second columns 79, excluding the first column 69 and the second column 79 disposed on the first side X1 in the second direction X and the first side Y1 in the third direction Y, has the holes 690 and 790, respectively, among four of the first columns 69 of the first coil holder 65 and four of the second columns 79 of the second coil holder 75. The holes 690 and 790 receive pins 20. In this embodiment, the pins 20 are round metal bars.

According to this embodiment, the connection between the first coil holder 65 and the second coil holder 75 can have enhanced strength against shock applied in a direction orthogonal to the first direction Z. Moreover, according to this embodiment, formation of the holes 690 in the first columns 69 of the first coil holder 65 and the holes 790 in the second columns 79 of the second coil holder 75 allows the holes 690 and 790 to have a large depth. This can enhance the strength of the connection between the first coil holder 65 and the second coil holder 75.

The pins 20 may be simply fit to the holes 690 and 790 or may be bonded to the inner faces of the holes 690 and 790. The ends of the first columns 69 and the ends of the second columns 79 may simply be disposed in contact with each other or may be bonded to each other. In either case, the first coil holder 65 and the second coil holder 75 are aligned in the first direction Z and are restrained by the restraining member 27 from the two sides in the first direction Z.

(Detailed Configuration of Restraining Member 27 and Elastic Members 4)

With reference to FIG. 4, the restraining member 27 includes a first sheetlike part 28 having a first end flat portion 281 adjacent to the first side Z1 of the first coil holder 65 in the first direction Z and a second sheetlike part 29 having a second end flat portion 291 adjacent to the second side Z2 of the second coil holder 75 in the first direction Z. The first end flat portion 281 has two through-holes 286 and 287 disposed apart from each other along the third direction Y and two through-holes 288 and 289 disposed apart from each other along the second direction X. The through-holes 286 and 287 align respectively with the through-holes 643a and 644a in the first yoke 64. The second end flat portion 291 has two through-holes 296 and 297 disposed apart from each other along the second direction X and two through-holes 298 and 299 disposed apart from each other along the third direction Y. The through-holes 296 and 297 align respectively with the through-holes 743a and 744a in the second yoke 74. In this embodiment, the first sheetlike part 28 and the second sheetlike part 29 are composed of metal plates.

The first sheetlike part 28 has two first side plate portions 282 that bend from the two edges of the first end flat portion 281 in the third direction Y toward the second side Z2 (the side adjacent to the second elastic member 42) in the first direction Z. The first side plate portions 282 are joined to the second end flat portion 291 of the second sheetlike part 29 by welding or any other means. The second sheetlike part 29 has two second side plate portions 292 that bend from the two edges of the second end flat portion 291 in the second direction X toward the first side Z1 (the side adjacent to the first elastic member 41) in the first direction Z. The second side plate portions 292 are joined to the first end flat portion 281 of the first sheetlike part 28 by welding or any other means.

In this state, the first coil holder 65 and the second coil holder 75 are aligned with in the first direction Z, and the restraining member 27 restrains the first coil holder 65 and the second coil holder 75 by pressing the two sides in the first direction Z. Since the first end flat portion 281 is adjacent to the first yoke 64 of the movable body 3 in the first direction Z, the first elastic member 41 is disposed between the first end flat portion 281 and the first yoke 64 while being compressed in the first direction Z. Since the second end flat portion 291 is adjacent to the second yoke 74 of the movable body 3 in the first direction Z, the second elastic member 42 is disposed between the second end flat portion 291 and the second yoke 74 while being compressed in the first direction Z.

According to this embodiment, the multiple components (the first coil holder 65 and the second coil holder 75) of the supporting body 2 are aligned with in the first direction Z and restrained from the two sides in the first direction Z by the restraining member 27. This stabilizes the dimension of the supporting body 2 in the first direction Z. The first elastic member 41 and the second elastic member 42 are disposed between the restraining member 27 and the movable body 3. This stabilizes the dimensions of the first elastic member 41 and the second elastic member 42 in the first direction Z. Thus, the first elastic member 41 and the second elastic member 42 are positioned in an appropriate state. Since the first elastic member 41 and the second elastic member 42 are disposed while being compressed in the first direction Z, the first elastic member 41 and the second elastic member 42 can be certainly disposed in contact with both the movable body 3 and the restraining member 27.

In this embodiment, the two faces of the first elastic member 41 may be disposed in contact with the first end flat portion 281 and the first yoke 64 while being fixed to the first end flat portion 281 and the first yoke 64 with an adhesive agent or may be disposed in contact with the first end flat portion 281 and the first yoke 64 without using an adhesive agent. Similar to the first elastic member 41, the two faces of the second elastic member 42 may be disposed in contact with the second end flat portion 291 and the second yoke 74 while being fixed to the second end flat portion 291 and the second yoke 74 with an adhesive agent or may be disposed in contact with the second end flat portion 291 and the second yoke 74 without using an adhesive agent.

(Configuration of Flexible Wiring Board 9)

With reference to FIG. 1 and FIG. 2, the flexible wiring board 9 is fixed to the movable body 3. The flexible wiring board 9 according to this embodiment includes a first portion 91 disposed closer to the first side Y1 of the third direction Y than the first coil 61 and the second coil 71 illustrated in FIG. 7 and FIG. 8, a bent portion 90 bent from the first portion 91 toward the second side Y2 in the third direction Y, and a second portion 92 extending from the bent portion 90 and disposed closer to the first side X1 in the second direction X than the first coil 61 and the second coil 71. One of the first portion 91 and the second portion 92 is provided with first terminals 96 connected to the wire of the first coil 61, and the other one of the first portion 91 and the second portion 92 is provided with second terminals 97 connected to the wire of the second coil 71. The second portion 92 is provided with multiple third terminals 98 for connection with external units.

In this embodiment, the end of the wire of the first coil 61 illustrated in FIG. 7 is routed through the cutout 665 in the first coil holder 65 toward the first side Y1 in the third direction Y along which the first effective side portions 611 and 612 extend. The end of the wire of the second coil 71 illustrated in FIG. 8 is routed through the cutout 765 in the second coil holder 75 toward the first side X1 in the second direction X along which the second effective side portions 711 and 712 extend. Thus, in this embodiment, the first portion 91 is provided with the first terminals 96, and the second portion 92 is provided with the second terminals 97.

The first portion 91 is a strip disposed on the adjacent to the first coil 61 on the first side Y1 in the third direction Y and extending in the second direction X. The first portion 91 is provided with multiple first terminals 96 extending in the second direction X. The first portion 91 is provided with a hole 916 receiving the protrusion 666 of the first coil holder 65.

The second portion 92 includes a third portion 93 extending from the bent portion 90 to the second side Z2 of the first direction Z and a fourth portion 94 that is a strip extending from the third portion 93, disposed adjacent to the second coil 71 on the first side X1 in the second direction X, and extending in the third direction Y. The fourth portion 94 is provided with multiple second terminals 97 extending along the third direction Y.

In the flexible wiring board 9, the first portion 91 is fixed to the external face of the first coil holder 65 with an adhesive agent or any other means, and the fourth portion 94 is fixed to the external face of the second coil holder 75 with an adhesive agent or any other means. The third portion 93 is fixed across the external face of the corresponding first column 69 of the first coil holder 65 and the external face of the corresponding second column 79 of the second coil holder 75. Thus, the actuator 1 does not require a separate component for fixing the flexible wiring board 9.

The third terminals 98 are arrayed along the first direction Z in the third portion 93 and are exposed on the restraining member 27. Thus, flexible wiring boards and wiring components for power feeding, such as lead wires, can be connected to the third terminals 98.

The fourth portion 94 is provided with a hole 946 receiving the protrusion 766 of the second coil holder 75. One of the holes 916 and 946 has a circular shape and the other has an elliptical shape. Thus, the position of the flexible wiring board 9 is adjustable in the extending direction (the second direction X or the third direction Y) of the flexible wiring board 9 by the length of the ellipse. In this embodiment, the hole 916 has an elliptical shape, and the hole 946 has a circular shape.

(Positional Relation of Magnetic Centers of Magnetic Drive Circuits and Center of Gravity of Movable Body 3)

In an actuator 1 having such a configuration, the first coil 61, the second coil 71, the first coil holder 65, and the second coil holder 75 are disposed axisymmetrically about an imaginary central line extending along the third direction Y while intersecting the center of the movable body 3 on the second direction X and axisymmetrically about an imaginary central line extending along the second direction X while intersecting the center of the movable body 3 on the third direction Y. The first magnets 621 and 622, the second magnets 721 and 722, the first yoke 64, and the second yoke 74 are disposed axisymmetrically about an imaginary central line extending along the third direction Y while intersecting the center of the movable body 3 on the second direction X and axisymmetrically about an imaginary central line extending along the second direction X while intersecting the center of the movable body 3 on the third direction Y.

Thus, the magnetic center (drive center) of the first magnetic drive circuit 6 exactly or substantially matches the center of gravity of the movable body 3 in the second direction X and the third direction Y. The magnetic center (drive center) of the second magnetic drive circuit 7 exactly or substantially matches the center of gravity of the movable body 3 in the second direction X and the third direction Y.

(Basic Operation)

In the actuator 1 according to this embodiment, feeding an alternating current to the first coil 61 while cutting off the current from the second coil 71 causes the movable body 3 to vibrate in the second direction X. This causes the center of gravity of the actuator 1 to shift in the second direction X. Thus, the user can sense the vibration in the second direction X. At this time, the waveform of the alternating current applied to the first coil 61 can be adjusted to cause a difference between the acceleration of the movable body 3 toward the first side X1 in the second direction X and the acceleration of the movable body 3 toward the second side X2 in the second direction X. This allows the user to sense vibration having directionality along the second direction X. An alternating current is applied to the second coil 71, while the current to the first coil 61 is cutoff. This causes the movable body 3 to vibrate in direction along the third direction Y, thereby causing the center of gravity of the actuator 1 to shift along the third direction Y. Thus, the user can sense the vibration in the third direction Y. At this time, the waveform of the alternating current applied to the second coil 71 can be adjusted to cause a difference between the acceleration of the movable body 3 toward the first side Y1 in the third direction Y and the acceleration of the movable body 3 toward second side Y2 in the third direction Y. This allows the user to sense vibration having directionality along the third direction Y.

By feeding an electrical current to both the first coil 61 and the second coil 71, the user can sense a combination of vibration in the second direction X and vibration in the third direction Y.

(Stopper Mechanism)

The actuator 1 according to this embodiment includes a stopper mechanism, such as that illustrated in FIG. 2 and FIG. 3, to prevent the movable body 3 from coming into contact with the supporting body 2 in areas having low strength when the movable body 3 shifts extensively relative to the supporting body 2. In detail, as illustrated in FIG. 3, a first seat 681 of the first coil holder 65 is disposed at a position at a predetermined distance from the first side Y1 of the first magnet 621 along the third direction Y, and a first seat 682 of the first coil holder 65 is disposed at a position at a predetermined distance from the second side Y2 of the first magnet 621 along the third direction Y. Thus, the movable range of the movable body 3 when the movable body 3 is driven along the third direction Y by the second magnetic drive circuit 7 is restricted by a first stopper mechanism including the first magnet 621 of the first magnetic drive circuit 6 and first seats 681 and 682 (first stoppers 683 and 684) of the first coil holder 65.

As illustrated in FIG. 2, a second seat 781 of the second coil holder 75 is disposed at a position at a predetermined distance from the first side X1 of the second magnet 721 of the second magnetic drive circuit 7 along the second direction X, and a second seat 782 of the second coil holder 75 is disposed at a position at a predetermined distance from the second side X2 of the second magnet 721 along the second direction X. Thus, the movable range of the movable body 3 when the movable body 3 is driven along the second direction X by the first magnetic drive circuit 6 is restricted by a second stopper mechanism including the second magnet 721 of the second magnetic drive circuit 7 and second seats 781 and 782 (second stoppers 783 and 784) of the second coil holder 75.

In this way, the first stopper mechanism includes the first seats 681 and 682 of the first coil holder 65 supporting the first coil 61, and the second stopper mechanism includes the second seats 781 and 782 of the second coil holder 75 supporting the second coil 71. Thus, protrusions (stopper) besides the first seats 681 and 682 and the second seats 781 and 782 need not to be provided on the first coil holder 65 and the second coil holder 75. Thus, the first coil holder 65 and the second coil holder 75 can have simple configurations.

(Method of Producing Actuator 1)

Figure 9:
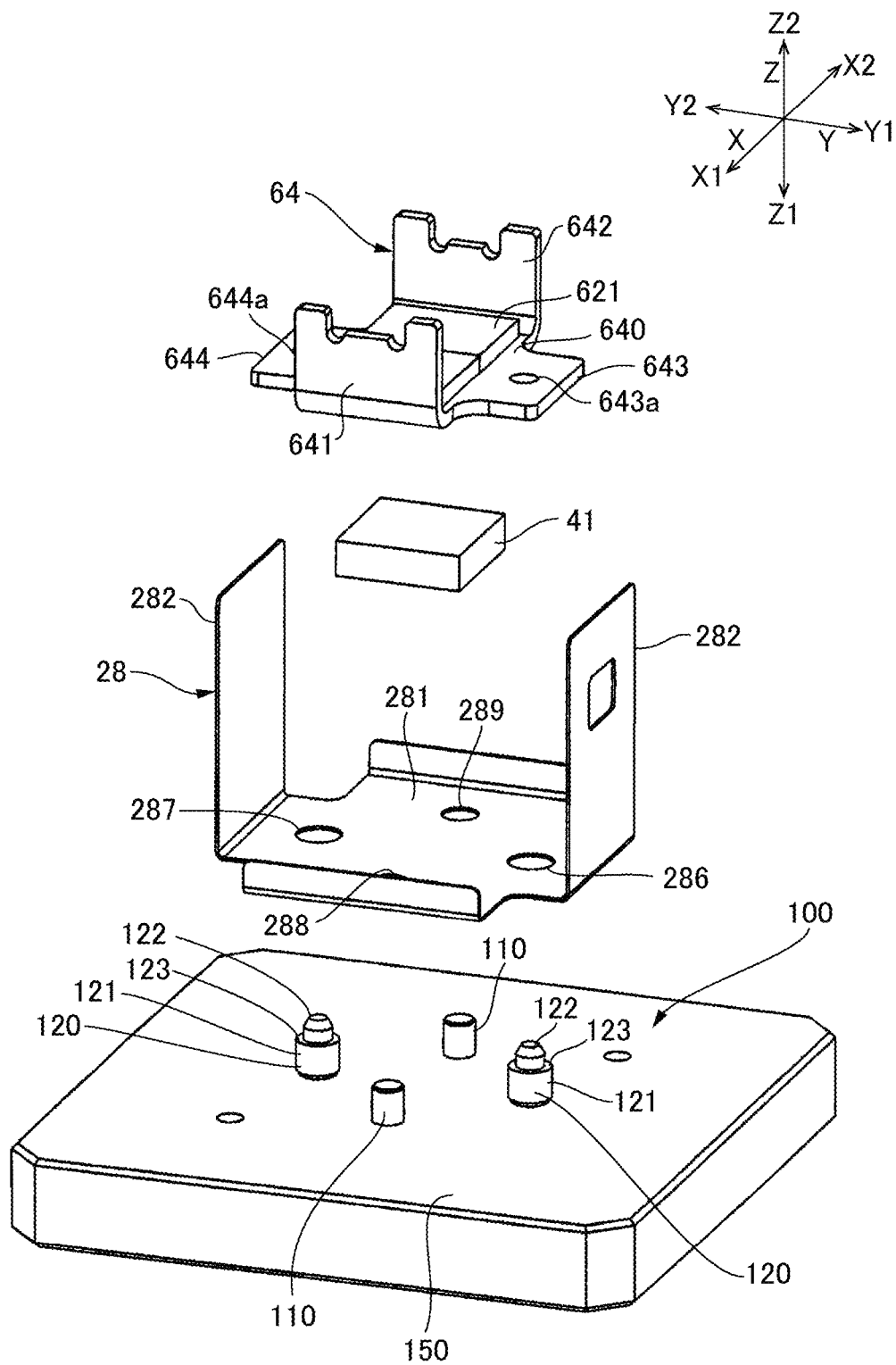
FIG. 9 illustrates a jig used in production of an actuator according to at least an embodiment of the present invention.
Figure 10:
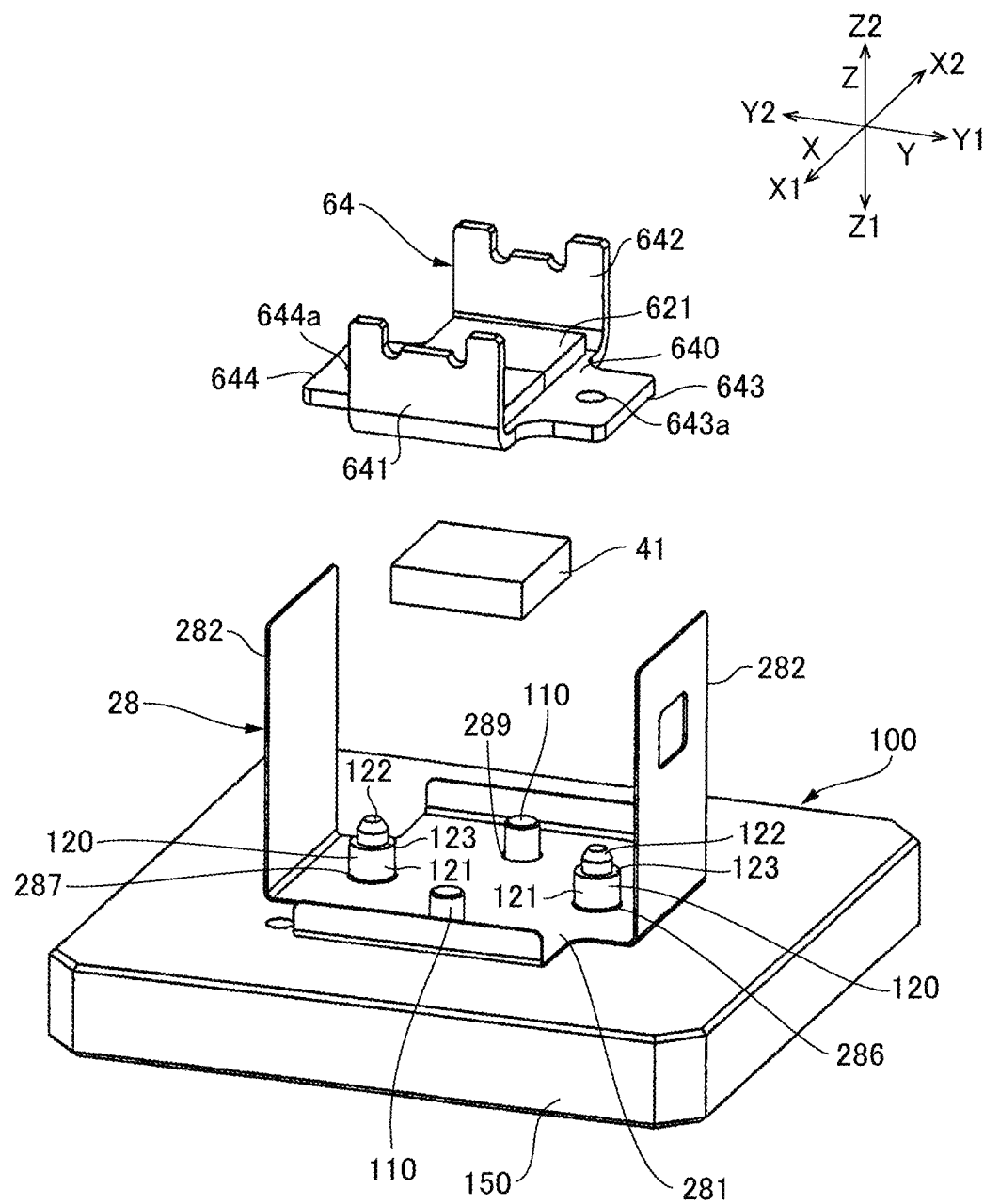
FIG. 10 illustrates the first sheetlike part of the restraining member positioned on the jig in FIG. 9.
Figure 11:
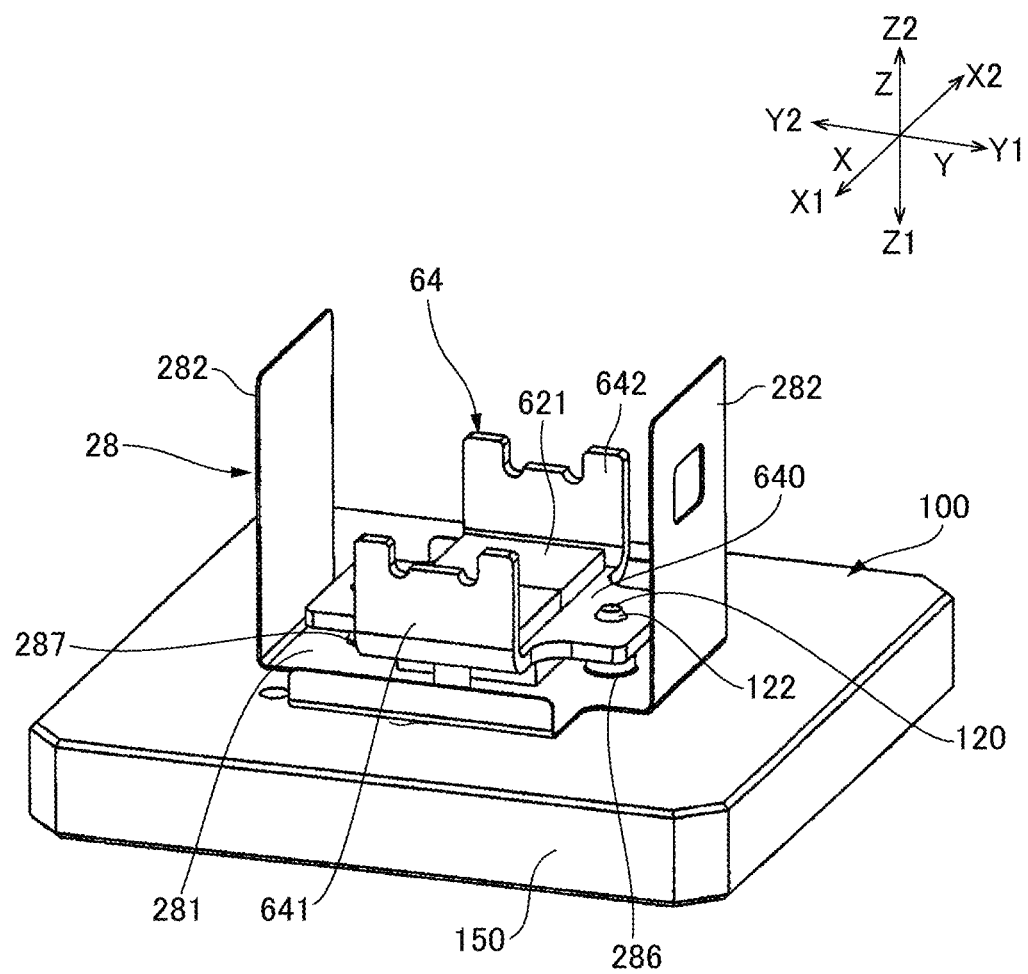
FIG. 11 illustrates a first yoke positioned on the first sheetlike part with the jig in FIG. 9.

FIG. 9 illustrates a jig 100 used in production of the actuator 1 according to at least an embodiment of the present invention. FIG. 10 illustrates the first sheetlike part 28 of the restraining member 27 positioned with the jig 100 illustrated in FIG. 9. FIG. 11 illustrates the first yoke 64 of the first sheetlike part 28 positioned with the jig 100 illustrated in FIG. 9.

Before producing the actuator 1, a jig 100 is prepared having multiple first positioning pins 110 protruding from the sheetlike support 150 in the first direction Z and multiple second positioning pins 120 protruding from the support 150 farther in the first direction Z than the first positioning pins 110, as illustrated in FIG. 9. In this embodiment, the jig 100 includes two first positioning pins 110 disposed apart from each other along the second direction X and two second positioning pins 120 disposed apart from each other along the third direction Y.

The second positioning pins 120 each have a thick portion 121 protruding from the support 150 in the first direction Z and a thin portion 122 having an outer diameter smaller than that of the thick portion 121 and protruding from the end of the thick portion 121.

A total of four through-holes 286, 287, 288, and 289 (first through-holes) are formed in the first end flat portion 281 of the first sheetlike part 28 of the restraining member 27 disposed at the farthest on the first side Z1 in the first direction Z on the supporting body 2. Among the four through-holes 286, 287, 288, and 289, the inner diameter of the two through-holes 288 and 289 disposed apart along the second direction X is slightly larger than the outer diameter of each of the first positioning pins 110, and the inner diameter of the two through-holes 286 and 287 disposed apart along the third direction Y is slightly larger than the outer diameter of the thick portion 121 of each of the second positioning pins 120.

Two through-holes 643a and 644a (second through-holes) disposed apart from each other along the third direction Y are formed in the first yoke 64 disposed on the farthest in the first direction Z on the first side Z1 of the movable body 3. The inner diameter of the through-holes 643a and 644a is slightly larger than the outer diameter of the thin portion 122 of each of the second positioning pins 120 and smaller than the outer diameter of the thick portion 121. The first magnet 621 is fixed to the first yoke 64.

In the first step of assembling the actuator 1 with the jig 100, the first positioning pins 110 are passed through the through-holes 288 and 289 in the first sheetlike part 28, and the second positioning pins 120 are passed through the through-holes 286 and 287, as illustrated in FIG. 10. As a result, the first sheetlike part 28 is positioned in contact with the jig 100.

The first elastic member 41 is disposed on the first end flat portion 281 of the first sheetlike part 28, and then, the second positioning pins 120 are passed through the through-holes 643a and 644a in the first yoke 64. As a result, the first positioning pins 110 are positioned in contact with the first yoke 64. A stepped portion 123 disposed between the thick portion 121 and the thin portion 122 of each of the second positioning pins 120 comes into contact with the first yoke 64, and the thin portion 122 protrudes from the first yoke 64.

The supporting body 2 and the movable body 3 are assembled on the basis of the first sheetlike part 28 and the first yoke 64. According to this method, the first sheetlike part 28 and the first yoke 64 are appropriately positioned in the second direction X, the third direction Y, and the first direction Z. This appropriately positions the components of the actuator 1 in the second direction X, the third direction Y, and the first direction Z after assembly of the supporting body 2 and the movable body 3 on the basis of the first sheetlike part 28 and the first yoke 64.

Other Embodiments

In the embodiment described above, the elastic members 4 are gelatinous dampers. Alternatively, the elastic members 4 may be composed of rubber or springs.

In the embodiment described above, the first yoke 64, the first magnet 621, the first coil 61, the first magnet 622, the third yoke 84, the second magnet 721, the second coil 71, the second magnet 722, and the second yoke 74 are disposed in this order from the first side Z1 to the second side Z2 in the first direction Z. Alternatively, at least an embodiment of the present invention may be applied to a configuration in which the first magnetic drive circuit 6 and the second magnetic drive circuit 7 are each provided with one magnet. For example, at least an embodiment of the present invention may be applied to an actuator 1 including the first yoke 64, the first coil 61, the first magnet 622, the third yoke 84, the second magnet 721, the second coil 71, and the second yoke 74, in this order. Alternatively, at least an embodiment of the present invention may be applied to an actuator 1 including the first yoke 64, the first magnet 621, the first coil 61, the third yoke 84, the second coil 71, the second magnet 722, and the second yoke 74, in this order.

In the embodiment described above, the coils and the coil holders are disposed on the supporting body 2, and the magnets and the yokes are disposed on the movable body 3. Alternatively, the coils and the coil holders may be disposed on the movable body 3, and the magnets and the yokes may be disposed on the supporting body 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
a supporting body;
a movable body structured to move relative to the supporting body;
a first magnetic drive circuit comprising:
   a first coil; and
   a first magnet adjacent to the first coil in a first direction;
   wherein the first magnetic drive circuit is structured to drive the movable body in a second direction orthogonal to the first direction;
a second magnetic drive circuit comprising:
   a second coil; and
   a second magnet adjacent the second coil in the first direction;
   wherein the second magnetic drive circuit is structured to drive the movable body in a third direction orthogonal to the first direction and intersecting the second direction, the second coil and the second magnet being aligned with the first magnetic drive circuit in the first direction;
a first yoke disposed on a side of the first coil remote from the second coil;
a second yoke disposed on a side of the second coil remote from the first coil; and
a third yoke disposed between the first coil and the second coil, wherein,
the first magnet is held on at least one of a face of the first yoke adjacent to the first coil and a face of the third yoke adjacent to the first coil,
the second magnet is held on at least one of a face of the second yoke adjacent to the second coil and a face of the third yoke adjacent to the second coil, and
the third yoke has a thickness larger than the first yoke and the second yoke in the first direction.

2. The actuator according to claim 1, wherein,
the first magnet is disposed adjacent to a first effective side portion in the first direction, the first effective side portion being disposed on the first coil and extending in the third direction,
the second magnet is disposed adjacent to a second effective side portion in the first direction, the second effective side portion being disposed on the second coil and extending in the second direction,
the first yoke and the third yoke are coupled with two first couplers extending in the first direction across two sides of the first coil in the second direction, and
the second yoke and the third yoke are coupled with two second couplers extending in the first direction across two sides of the second coil in the third direction.

3. The actuator according to claim 2, wherein,
the first couplers each comprises a sheetlike portion bent from a portion of the first yoke adjacent to the first coil in the first direction toward the third yoke, and
the second couplers each comprises a sheetlike portion from a portion of the second yoke adjacent to the second coil in the first direction bent toward the third yoke.

4. The actuator according to claim 3, further comprising:
a first coil holder holding the first coil; and
a second coil holder holding the second coil, wherein,
the first coil holder comprises:
   a first frame holding the first coil;
   a first reinforcement frame disposed on a side of the first frame remote from the second coil holder; and
   a plurality of first columns extending in the first direction and coupling the first frame and the first reinforcement frame,
the second coil holder comprises:
   a second frame holding the second coil;
   a second reinforcement frame disposed on a side of the second frame remote from the first coil holder; and
   a plurality of second columns extending in the first direction and coupling the second frame and the second reinforcement frame,
a portion of the first yoke adjacent to the first coil is disposed between the first frame and the first reinforcement frame in the first direction, and
a portion of the second yoke adjacent to the second coil is disposed between the second frame and the second reinforcement frame in the first direction.

5. The actuator according to claim 4, wherein,
the first magnet is held on a face of the first yoke adjacent to the first coil and a face of the third yoke adjacent to the first coil, and
the second magnet is held on a face of the second yoke adjacent to the second coil and a face of the third yoke adjacent to the second coil.

6. The actuator according to claim 5, wherein,
the first coil and the second coil are disposed on the supporting body, and
the first magnet, the second magnet, the first yoke, the second yoke, and the third yoke are disposed on the movable body.

7. The actuator according to claim 6, wherein,
a first elastic member having elasticity or viscoelasticity is disposed in contact with both the movable body and a first sheetlike part of the supporting body, the first elastic member being disposed between the movable body and the first sheetlike part of the supporting body adjacent to a side of the first coil on the movable body, the side of the first coil being remote from the second coil, and
a second elastic member having elasticity or viscoelasticity is disposed in contact with both the movable body and a second part of the supporting body, the second elastic member being disposed between the movable body and the second part of the supporting body adjacent to a side of the second coil on the movable body, the side of the second coil being remote from the first coil.

8. The actuator according to claim 7, wherein,
the first elastic member is disposed between the first sheetlike part and the first yoke and in contact with both the first sheetlike part and the first yoke, and
the second elastic member is disposed between the second part and the second yoke and in contact with both the second part and the second yoke.

9. The actuator according to claim 1, further comprising:
a first coil holder holding the first coil,
a second coil holder holding the second coil, wherein,
the first coil holder comprises:
   a first frame holding the first coil;
   a first reinforcement frame disposed on a side of the first frame remote from the second coil holder; and a plurality of first columns extending in the first direction and coupling the first frame and the first reinforcement frame, the second coil holder comprises:
- a second frame holding the second coil;
- a second reinforcement frame disposed on a side of the second frame remote from the first coil holder; and
- a plurality of second columns extending in the first direction and coupling the second frame and the second reinforcement frame, a portion of the first yoke adjacent to the first coil is disposed between the first frame and the first reinforcement frame in the first direction, and a portion of the second yoke adjacent to the second coil is disposed between the second frame and the second reinforcement frame in the first direction.

10. The actuator according to claim 1, wherein,
the first magnet is held on a face of the first yoke adjacent to the first coil and a face of the third yoke adjacent to the first coil, and
the second magnet is held on a face of the second yoke adjacent to the second coil and a face of the third yoke adjacent to the second coil.

11. The actuator according to claim 1, wherein,
the first coil and the second coil are disposed on the supporting body, and
the first magnet, the second magnet, the first yoke, the second yoke, and the third yoke are disposed on the movable body.

12. The actuator according to claim 11, wherein,
a first elastic member having elasticity or viscoelasticity is disposed in contact with both the movable body and a first sheetlike part of the supporting body, the first elastic member being disposed between the movable body and the first sheetlike part of the supporting body adjacent to a side of the first coil on the movable body, the side of the first coil being remote from the second coil, and
a second elastic member having elasticity or viscoelasticity is disposed in contact with both the movable body and a second part of the supporting body, the second elastic member being disposed between the movable body and the second part of the supporting body adjacent to a side of the second coil on the movable body, the side of the second coil being remote from the first coil.

13. The actuator according to claim 12 wherein,
the first elastic member is disposed between the first sheetlike part and the first yoke and in contact with both the first sheetlike part and the first yoke, and
the second elastic member is disposed between the second part and the second yoke and in contact with both the second part and the second yoke.

\* \* \* \* \*